(12) United States Patent
Nakajima et al.

(10) Patent No.: US 7,729,564 B2
(45) Date of Patent: Jun. 1, 2010

(54) OPTICAL FIBER PROVIDED WITH RELIABLE COATING LAYERS

(75) Inventors: Yasuo Nakajima, Tokyo (JP); Hiroki Tanaka, Tokyo (JP); Yoshihiro Arashitani, Tokyo (JP); Takayoshi Ono, Tokyo (JP)

(73) Assignee: The Furukawa Electric Co., Ltd., Tokyo (JP)

( * ) Notice: Subject to any disclaimer, the term of this patent is extended or adjusted under 35 U.S.C. 154(b) by 603 days.

(21) Appl. No.: 11/659,500

(22) PCT Filed: Jul. 28, 2006

(86) PCT No.: PCT/JP2006/315437
§ 371 (c)(1), (2), (4) Date: Feb. 6, 2007

(87) PCT Pub. No.: WO2008/012926
PCT Pub. Date: Jan. 31, 2008

(65) Prior Publication Data
US 2009/0269015 A1   Oct. 29, 2009

(51) Int. Cl.
*G02F 1/01* (2006.01)
*G02B 6/02* (2006.01)

(52) U.S. Cl. .............. 385/1; 385/123; 385/128

(58) Field of Classification Search ............ None
See application file for complete search history.

(56) References Cited

U.S. PATENT DOCUMENTS

| | | | |
|---|---|---|---|
| 5,298,291 A * | 3/1994 | Klinger et al. ............ 427/513 |
| 6,181,859 B1 * | 1/2001 | Suzuki et al. ............ 385/128 |
| 6,775,451 B1 | 8/2004 | Botelho et al. | |
| 6,882,788 B2 * | 4/2005 | Van Bergen et al. ......... 385/127 |
| 7,085,465 B2 | 8/2006 | Ono et al. | |
| 7,209,614 B2 | 4/2007 | Tanaka et al. | |
| 2002/0168165 A1 * | 11/2002 | Chien et al. ............ 385/128 |
| 2004/0013383 A1 | 1/2004 | Ono et al. | |
| 2005/0141831 A1 * | 6/2005 | Bocanegra et al. ......... 385/100 |
| 2005/0241820 A1 * | 11/2005 | Wasserman et al. ......... 166/100 |

FOREIGN PATENT DOCUMENTS

| EP | 0 976 692 A1 | 2/2000 |
|---|---|---|
| EP | 1 227 350 A1 | 7/2002 |

(Continued)

OTHER PUBLICATIONS

U.S. Appl. No. 12/003,435, filed Dec. 26, 2007, Nakajima, et al.

(Continued)

*Primary Examiner*—Tina M Wong
(74) *Attorney, Agent, or Firm*—Oblon, Spivak, McClelland, Maier & Neustadt, L.L.P.

(57) ABSTRACT

An optical fiber is provided, which is unlikely to cause interlayer delamination between a glass optical fiber and a primary coating layer even when it is immersed in water. The optical fiber of the present invention includes a glass optical fiber 1 consisting of a core and a cladding, a primary coating layer 2 overlaid on the glass optical fiber, and a secondary coating layer 3 overlaid on the primary coating layer, wherein the relaxation modulus of the secondary coating layer is set at 400 MPa or less.

1 Claim, 2 Drawing Sheets

FOREIGN PATENT DOCUMENTS

| | | |
|---|---|---|
| FR | 2 839 159 A1 | 10/2003 |
| JP | 62-99711 | 5/1987 |
| JP | 2001 328851 | 11/2001 |
| JP | 2002 122761 | 4/2002 |
| JP | 2002 372655 | 12/2002 |
| JP | 2003 322775 | 11/2003 |
| JP | 2004 4423 | 1/2004 |
| WO | 98 31642 | 7/1998 |
| WO | WO 02/075401 A2 | 9/2002 |

OTHER PUBLICATIONS

U.S. Appl. No. 11/661,670, filed Mar. 2, 2007, Nakajima, et al.
U.S. Appl. No. 11/794,253, filed Jun. 27, 2007, Nakajima, et al.
U.S. Appl. No. 12/235,123, filed Sep. 22, 2008, Nakajima, et al.

* cited by examiner

OPTICAL FIBER PROVIDED WITH RELIABLE COATING LAYERS

FIELD OF THE INVENTION

The present invention relates to an optical fiber for transmitting optical signals having highly reliable coating layers.

BACKGROUND ART

Conventional optical fibers generally have a structure, as shown in FIG. 1, in which a soft primary coating layer 2 is overlaid on a glass optical fiber 1 consisting of silica glass having a core and a cladding which is provided outside the core, and a hard secondary coating layer 3 is further overlaid on the primary coating layer 2.

Typically, a UV curable resin having Young's modulus of 3 MPa or less has been used as the primary coating layer 2, and a UV curable resin having Young's modulus of 500 MPa or more has been used as the secondary coating layer 3.

When such an optical fiber ribbon is immersed in water, delamination may occur at an interface between the glass optical fiber 1 and the primary coating layer 2

If case such delamination is caused, uneven force acts on the glass optical fiber induced by the delamination to cause microbending, whereby the transmission loss is increased. In order to prevent the occurrence of the delamination, extraordinary efforts have been made by thoroughly examining the material of each of the coating layers so as to ensure sufficient adhesion between the primary coating layer 2 and the glass optical fiber 1.

However, there is a limitation in ensuring such sufficient adhesiveness while maintaining the function of each of the coating layers. It has therefore been a practice instead to optimize the cable structure and the matrix, or the quality of material for a colored layer, or to adjust manufacturing conditions.

Japanese Patent Application Laid-Open No. 2002-122761 (Patent Document 1), for example, deals with such approaches and discloses a method for maintaining transmission characteristics in good conditions by defining the water absorption coefficient of the coating resin layers of an optical fiber.

Also, Japanese Patent Application Laid-Open No. 2002-372655 (Patent Document 2) discloses a method for reducing an amount of water that reaches the optical fiber by reducing the water absorption coefficient of the colored layer.

The method described in Patent Document 1 retains the water absorption coefficient of the optical fiber at a low level by controlling the storage conditions of the optical fiber, suppresses foaming caused by water contained in the coating, and prevents deterioration in the hydraulic characteristics and low-temperature characteristics. However, this method cannot be an effective measure for preventing the increase in the loss due to the occurrence of microbending which is caused at the time when water reaches the optical fiber under the usage environment mentioned above.

Even the method described in Patent Document 2 cannot completely shut out water that reaches the optical fiber, and thus the loss due to microbending unavoidably increases depending on the usage environment.

Thus, under the present circumstances, there is no extremely effective measure for suppressing the loss increase when an optical fiber is immersed in water.

In light of the problem provided above, the present invention has an object of providing an optical fiber which is unlikely to cause interlayer delamination between a glass optical fiber and a primary coating layer even when the optical fiber is immersed in water.

SUMMARY OF THE INVENTION

In order to accomplish the above object, an optical fiber according to the present invention comprises a glass optical fiber consisting of a core and a cladding, a primary coating layer overlaid on the glass optical fiber, and a secondary coating layer overlaid on the primary coating layer, characterized in that the relaxation modulus of the secondary coating layer is 400 MPa or less.

In the above optical fiber, the residual stress between the glass optical fiber and the primary coating layer at the time of manufacturing the optical fiber can be suppressed to a small level by allowing the relaxation modulus of the secondary coating layer to be 400 MPa or less, thereby obtaining an optical fiber which is unlikely to cause delamination between the glass optical fiber and the primary coating layer. Thus, even when water reaches the glass optical fiber, the transmission loss is hardly increased, so that an optical fiber having high performance as a transmission line and having high reliability can be obtained.

One embodiment of the optical fiber according to the present invention is characterized in that 1.0 parts per hundred of resin of silane coupling agent is added to a UV curable resin used for the primary coating layer.

In the above embodiment of the optical fiber, since the adhesiveness between the glass optical fiber and the primary coating layer when immersed in water can be increased, even when further immersed in water, an optical fiber can be obtained, in which delamination is unlikely to occur between the glass optical fiber and the primary coating layer. In this way, an optical fiber cable having quite excellent long-term reliability can be obtained, in which water that may reach the optical fiber does not cause transmission loss.

As described above, the present invention can prevent delamination between a glass optical fiber and a soft coating layer in the case where the optical fiber is immersed in water. Thus, increase in the transmission loss due to microbending can be suppressed.

DETAILED DESCRIPTION OF THE EMBODIMENT

Hereinafter is described an optical fiber of the present invention with reference to the accompanying drawings.

Figure 1:
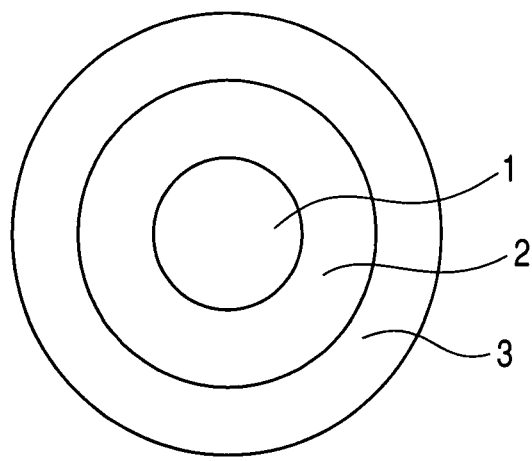
FIG. 1 is a cross section showing one example of an optical fiber according to the present invention.

FIG. 1 is a schematic cross section showing one example of the optical fiber of the present invention. As shown in FIG. 1, the optical fiber of the present invention includes a glass optical fiber 1 at the center, which consists of a core and a cladding, a primary coating layer 2 overlaid on the glass optical fiber 1, and a secondary coating layer 3 overlaid on the primary coating layer 2, and is characterized in that the relaxation modulus of the secondary coating layer 3 is rendered to be 400 MPa or less.

The reason why the relaxation modulus of the secondary coating layer 3 is rendered to be 400 MPa or less is that the relaxation modulus exceeding 400 MPa causes large residual stress between the glass optical fiber 1 and the primary coating layer 2, and thus delamination is likely to occur between the glass optical fiber 1 and the primary coating layer when the optical fiber is immersed in water, tending to increase the transmission loss.

The relaxation modulus of the secondary coating layer referred to in the present invention is an elasticity modulus calculated from a stress which is being relieved, which stress has resulted through a course of raising the temperature of the secondary coating layer up to a glass transition temperature (Tg) or more in a stress-free state, thereafter cooling the secondary coating layer down to room temperature while keeping pulling the secondary coating layer at a constant tensile strain rate, and after the temperature has reached room temperature, further keeping imparting a constant tensile strain to the secondary coating layer while maintaining the temperature until the stress imposed on the secondary coating layer is relieved.

Further, the optical fiber of the present invention is characterized in that 1.0 or more parts per hundred of resin of silane coupling agent is added to a resin used for the primary coating layer 2.

The reason why an additive amount of the silane coupling agent has been determined to be 1.0 or more parts per hundred of resin is that, if the additive amount is less than 1 parts per hundred of resin, the adhesiveness between the glass optical fiber 1 and the primary coating layer 2 is deteriorated, and thus delamination is likely to occur between the glass optical fiber 1 and the primary coating layer when the water has reached the optical fiber, tending to increase the transmission loss.

Generally, optical fibers are manufactured by the following procedure. First of all, a tip of an optical fiber preform made of silica based glass is heated up to about 2000° C. for melting, followed by drawing the material by imposing a tensile force thereon to thereby obtain a glass optical fiber. The resultant glass optical fiber is then coated with a UV curable resin, for example, for coverage, followed by irradiating UV rays for curing the UV curable resin to thereby form a coating layer along an outside of the glass optical fiber. Subsequently, the glass optical fiber is pulled by a take-off unit called capstan, and the optical fiber is finally manufactured.

In the course of manufacturing this optical fiber, the coating layer, when it is formed, is temporarily heated by the radiant heat of infrared rays produced by a UV lamp and the heat of reaction of the resin, and then is gradually cooled until the optical fiber is pulled by the capstan. In this regard, if the linear expansion coefficient largely differs between the primary coating layer and the secondary coating layer, large residual stress that works in the direction of separating the primary coating layer from the glass optical fiber remains in the primary coating layer. Since the residual stress is greatly influenced by the relaxation modulus of the secondary coating layer, it is considered that the residual stress in the primary coating layer can be reduced by rendering the relaxation modulus of the secondary coating layer to 400 MPa or less.

The relaxation modulus of the secondary coating layer can be readily controlled by changing the molecular weight of radical polymerizable oligomer of the resin for the secondary coating layer, or by changing a rate of terminating an unsaturated group at both ends of the radical polymerizable oligomer. In particular, the relaxation modulus of the secondary coating layer can be reduced by increasing the molecular weight of the radical polymerizable oligomer of the resin for the secondary coating layer, or by raising the rate of terminating the unsaturated group at both ends of the radical polymerizable oligomer.

Further, the addition of the silane coupling agent to the resin used for the primary coating layer by the amount of 1.0 or more parts per hundred of resin can increase the adhesion between the glass optical fiber and the primary coating layer when immersed in water, whereby the glass optical fiber is made barely separable from the primary coating layer even when water has reached the optical fiber.

The primary coating layer 2 and the secondary coating layer 3 used in the present invention are not limited in particular, but a UV curable type resin composition (hereinafter referred to simply as a "UV resin") is principally used. From the viewpoint of the curing rate, most suitable layers may have, as a main component, a resin composition containing an oligomer of urethane-acrylate base or epoxy-acrylate base.

The UV resins typically contain, as basic components, radical polymerizable oligomers containing unsaturated groups (e.g., acryloyl group), reactive monomers as diluting agents, and photoinitiators which produce active species, such as radicals, by absorbing light energy. UV resins are formulated with required amount of various additives, such as pigments, coloring agents, UV absorbents, light stabilizers, sensitizers, chain transfer agents, polymerization inhibitors, silane coupling agents, leveling agents, lubricants, oxidation stabilizers, antioxidants, anti-weathering agents, inhibitors, plasticizers and surface active agents.

The silane coupling agents include, for example, γ-aminopropyltriethoxysilane, γ-mercaptopropyltrimethoxysilane and γ-methacryloxypropyltrimethoxysilane.

A UV resin having optimal values in various characteristics, such as permeability, Young's modulus after curing, curing rate, and water absorption, which are required for the resin when used as the primary coating layer or the secondary coating layer for the optical fiber, can be obtained by primarily selecting a type, structure and molecular weight of the radical polymerizable oligomer, by selecting a type of the reactive monomer and photoinitiator, and by adjusting a compounding ratio of the radical polymerizable oligomer, the reactive monomer and the photoinitiator.

Preferably, Young's modulus of the primary coating layer is 2.5 MPa or less, more preferably, 1.5 MPa or less at room temperature (23° C.). Preferably, Young's modulus of the secondary coating layer is 100 to 2000 MPa or less, more preferably, 400 to 1000 MPa or less at room temperature (23° C.).

When Young's modulus of the primary coating layer exceeds 2.5 MPa, or when Young's modulus of the secondary coating layer exceeds 2000 MPa, the lateral pressure characteristics are deteriorated. Contrarily, when Young's modulus of the secondary coating layer is less than 100 MPa, the rigidity becomes poor.

Although there is no limitation in the thicknesses of the primary coating layer and the secondary coating layer, the thickness of each of the primary coating layer and the secondary coating layer may preferably be about 10 µm to about 50 µm. For example, in case a glass optical fiber having a diameter of about 125 µm is used, an arrangement may typically be made so that the primary coating layer has an outer diameter of about 180 µm to 200 µm, and the secondary coating layer has an outer diameter of about 230 µm to 250 µm.

EXAMPLES

In the optical fiber described above and having a structure shown in FIG. 1, the relaxation modulus of the secondary coating layer 3 was varied and the additive amount of the silane coupling agent was varied to prepare optical fibers corresponding to the Examples of the present invention and those for Comparative Examples. It should be noted that γ-mercaptopropyltrimethoxysilane was used as the silane coupling agent. This is shown in Table 1.

It should also be noted that the optical fiber was a standard single-mode optical fiber with the glass optical fiber having an outer diameter of about 125 µm, the primary coating layer having an outer diameter of about 195 µm and the secondary coating layer having an outer diameter of about 245 µm.

Further, as the primary coating layer, several types of 0.2-mm cured sheets of urethane-acrylate base UV resins with Young's modulus of 1.0 MPa were used. As the secondary coating layer, 0.2-mm cured sheets of urethane-acrylate base UV resins S1 to S5 with Young's modulus as shown in Table 1 were used.

Young's modulus of each of the cured sheets was calculated based on a tensile force when the strain was 2.5%, which strain has resulted through a course of preparing a 0.2-mm thick sheet that had been cured in the atmospheric air with UV irradiance of 200 mW/cm$^2$ and UV irradiation of 1000 mJ/cm$^2$, and performing tensile tests at a temperature 23° C. and at a tension rate 1 mm/min.

Table 1 shows obtained Young's modulus of the primary coating layers and those of the secondary coating layers of the optical fibers of Examples 1 to 8 and Comparative Examples 1 to 5. Each of Young's modulus of the primary coating layers of the optical fibers was derived by using the method described in Japanese Patent Application Laid-Open No. 2001-328851, i.e. by measuring rigidity modulus of the primary coating layer, with Poisson's ratio being 0.45. Each of Young's modulus of the secondary coating layers of the optical fibers was measured by using the method described in Japanese Patent Application Laid-Open No. 2003-322775.

TABLE 1

|  | Examples | | | | | | | | Comparative Examples | | | | |
|---|---|---|---|---|---|---|---|---|---|---|---|---|---|
|  | 1 | 2 | 3 | 4 | 5 | 6 | 7 | 8 | 1 | 2 | 3 | 4 | 5 |
| UV resin for secondary coating layer | S1 | S1 | S1 | S2 | S2 | S2 | S2 | S3 | S4 | S4 | S4 | S4 | S5 |
| Additive amount of silane coupling agent (parts per hundred of resin) | 0.5 | 1.0 | 2.0 | 0.5 | 1.0 | 2.0 | 1.0 | 1.0 | 0.5 | 1.0 | 2.0 | 1.0 | 1.0 |
| Young's modulus of cured sheet of resin for the secondary coating layer (MPa) | 680 | 680 | 680 | 470 | 470 | 470 | 470 | 530 | 600 | 600 | 600 | 600 | 720 |
| Young's modulus of the primary coating layer of the optical fiber (MPa) | 0.9 | 0.9 | 0.9 | 0.9 | 0.9 | 0.9 | 0.7 | 0.8 | 0.9 | 0.9 | 0.9 | 0.8 | 0.9 |
| Young's modulus of the secondary coating layer of the optical fiber (MPa) | 800 | 800 | 800 | 530 | 530 | 530 | 530 | 600 | 700 | 700 | 700 | 700 | 820 |

The relaxation moduli of the secondary coating layers for Examples 1 to 8 and Comparative Examples 1 to 5 were measured.

Colored optical fibers were obtained by applying the UV curable resins for coloring onto the obtained optical fibers as mentioned above, and irradiating UV rays thereto for curing. Then, four of the colored optical fibers were juxtaposed in parallel, whose outer peripheries were applied, at a time, with the UV curable resins to provide taping, followed by the irradiation of UV rays to thereby obtain ribbon optical fibers.

Thus obtained ribbon optical fibers were immersed in hot water having a temperature 60° C. After that, observation was made as to the occurrences of delamination between the glass optical fiber and the primary coating layer, and at the same time, measurement was made as to the increase in the transmission loss. The results are shown in Table 2.

Figure 2:
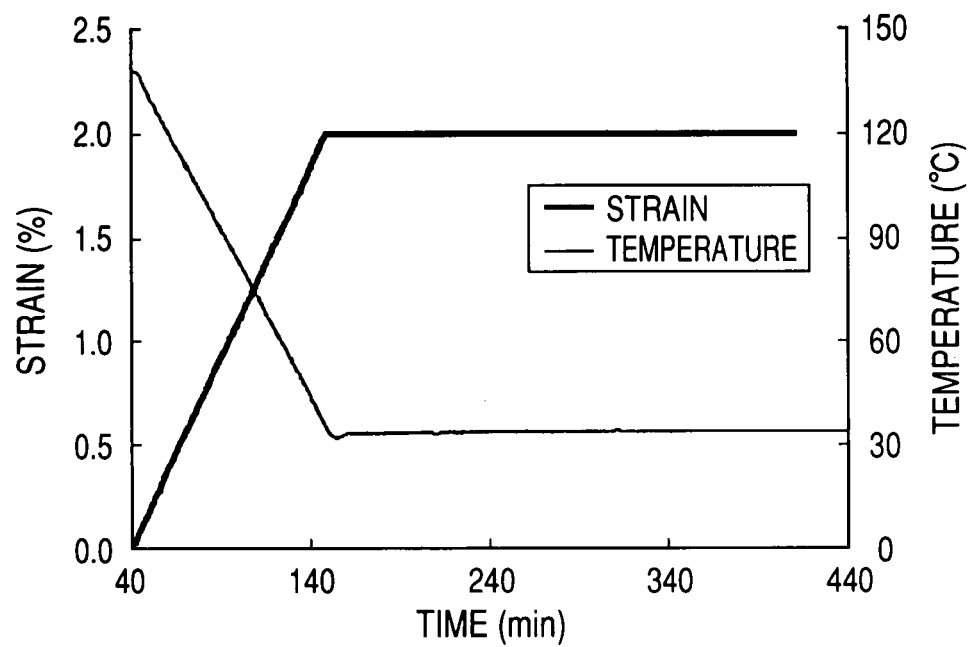
FIG. 2 is a graph showing profiles of temperature and strain of a sample during measurement of the relaxation modulus.
Figure 3:
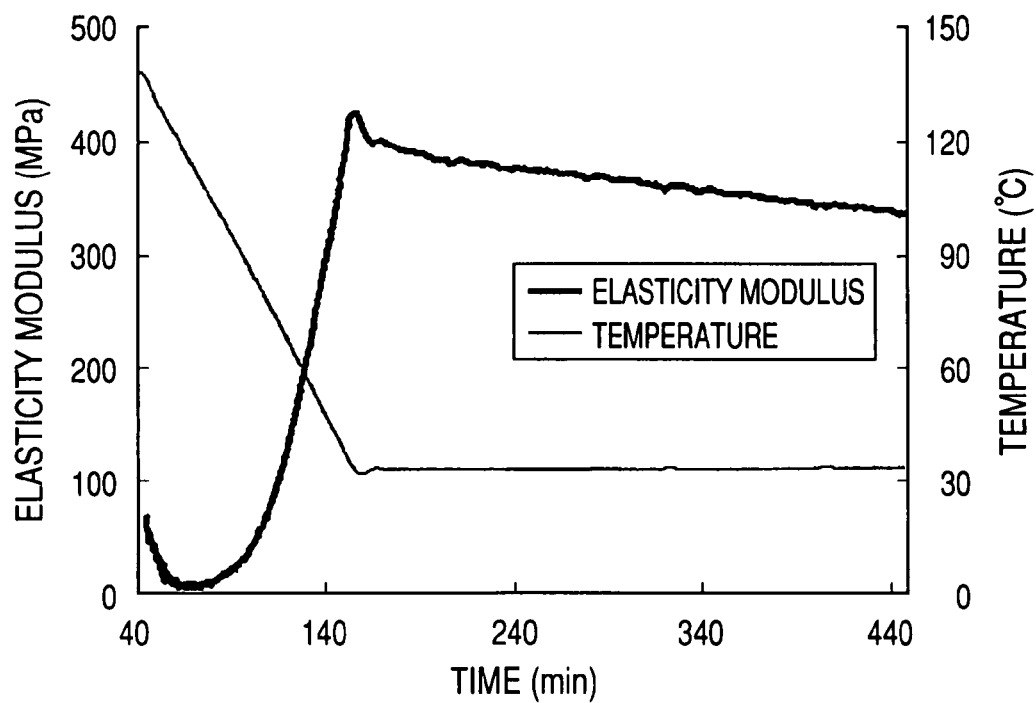
FIG. 3 is a graph showing a tensile stress profile during measurement of the relaxation modulus, which has been converted to elasticity modulus.

FIGS. 2 and 3, the thick lines indicate the strain and the elasticity modulus, respectively, and the thin lines each indicate temperature.

It should be noted that a viscoelasticity measuring device (Dynamic mechanical analyzer) SEIKO Instruments DMS6100 was used for measurement.

Observation of Occurrences of Delamination Between the Glass Optical Fibers and the Primary Coating Layers An optical fiber of about 1 m in length was immersed in ion-exchanged water for 30 days. After that, an interface between the glass optical fiber and the primary coating layer was observed through transmitted light using an optical microscope. The observation was made at about 100× magnification.

In Table 2, "⊚" indicates no delamination, "○" indicates minute delamination (of an extent causing no problem), and "X" indicates delamination as occurred.

TABLE 2

| | Examples | | | | | | | | Comparative Examples | | | | |
|---|---|---|---|---|---|---|---|---|---|---|---|---|---|
| | 1 | 2 | 3 | 4 | 5 | 6 | 7 | 8 | 1 | 2 | 3 | 4 | 5 |
| Relaxation modulus of the secondary coating layer of the optical fiber (MPa) | | 330 | | | 140 | | 140 | 270 | | 430 | | 430 | 510 |
| Occurrence of delamination of the optical fiber after immersion in hot water | ○ | ○ | ⊚ | ○ | ⊚ | ⊚ | ⊚ | ⊚ | X | X | X | X | X |
| Increase in transmission loss after immersing the optical fiber in hot water (dB/km) | 0.09 | 0.02 | 0.00 | 0.09 | 0.00 | 0.00 | 0.01 | 0.01 | 0.23 | 0.19 | 0.11 | 0.17 | 0.23 |

Measurement of the relaxation modulus of each of the secondary coating layers, observation of the occurrences of delamination between each of the glass optical fiber and each of the primary coating layers, and measurement in the increase of the transmission loss were performed as follows.

Method for Measuring the Relaxation Module of the Secondary Coating Layers

An optical fiber was immersed in liquid nitrogen and then the glass optical fiber was pulled out to obtain a tubular sample of 30 mm in length for measurement, which was an integration of the primary coating layer and the secondary coating layer. Temperature of the sample was raised up to 140° C. in a stress-free state. Then, the sample was continuously pulled at a constant tensile strain rate of 0.02%/min (gauge length of the sample: 20 mm) while being gradually cooled down to room temperature at a rate of 1° C./min. When the sample was cooled down to room temperature, 2% tensile strain was imposed on the samples. After that, the sample was left for 300 minutes with the temperature being kept at room temperature and the tensile strain being fixed at 2%. After being left, the elasticity modulus of the sample was calculated from the tensile stress imposed on the sample then, and the result of the calculation was rendered to be the relaxation modulus. FIG. 2 shows profiles of the temperature and the strain of the sample during measurement. A typical example of a profile of the tensile stress that was measured at this time and converted to elasticity modulus is shown in FIG. 3. In

[Measurement of the Increase of the Transmission Loss]

A bundled optical fiber of 1000 m in length was immersed in ion-exchanged water having a temperature of 60° C. for 30 days. After that, transmission loss was measured using an OTDR. The measurement wavelength was 1550 nm. A difference between thus obtained transmission loss and a transmission loss that has been similarly measured using the OTDR before immersion in the ion-exchanged water was regarded as an increase of the transmission loss. The increase in the transmission loss is smaller the better. In particular, 1.00 dB/km or less is a practical level.

As is apparent from Table 2, each of Examples 1 to 8, which are the optical fibers of the present invention, causes no delamination between the glass optical fiber and the primary coating layer even after immersion in the ion-exchanged water having a temperature of 60° C. for 30 days, and the transmission loss is suppressed at 0.10 dB/km or less. Further, it can be seen that the additive amount of the silane coupling agent by 1.0 parts per hundred of resin in the primary coating member can suppress the increase in the transmission loss to 0.05 dB/km or less. It can also be seen that, in case the additive amount of the silane coupling agent is 2.0 parts per hundred of resin, the increase in the transmission loss can be made as small as 0.02 dB/km or less.

With the optical fiber of the present invention, a plurality of optical fiber each provided with a colored layer, for example, and ribbon optical fibers using the colored optical fiber, as well as a plurality of the colored optical fiber and the ribbon optical fibers can be collectively provided to obtain an optical fiber code or an optical fiber cable. As a matter of course, the optical fiber of the present invention can be used for generally used various modes of colored optical fibers, ribbon optical fibers, optical fiber codes and optical fiber cables.

As described above, the present invention can provide an optical fiber which is unlikely to cause interlayer delamination between the glass optical fiber and the primary coating layer even when it is immersed in water, by allowing the relaxation modulus of the secondary coating layer to be 400 MPa or less. Further, by setting the additive amount of the silane coupling agent at 1.0 or more parts per hundred of resin, higher effects can be obtained.

The invention claimed is:

1. An optical fiber comprising a glass optical fiber consisting of a core and a cladding, a primary coating layer overlaid on said glass optical fiber, and a secondary coating layer provided on said primary coating layer, wherein the relaxation modulus of said secondary coating layer is 400 MPa or less and a silane coupling agent of 1.0 or more parts per hundred of resin is added to a resin used for the primary coating layer.

* * * * *